US012774661B2

(12) United States Patent
Mathew et al.

(10) Patent No.: US 12,774,661 B2
(45) Date of Patent: Oct. 27, 2026

(54) LOW FRICTION COATINGS FOR BROAD TEMPERATURE RANGES

(71) Applicant: General Electric Company, Schenectady, NY (US)

(72) Inventors: Paul Mathew, Bengaluru (IN); Sathisha Chikkabikkodu Hanum, Bengaluru (IN); Mohandas Nayak, Bengaluru (IN); Souvik Math, Bengaluru (IN); Ravindra Shankar Ganiger, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/037,388

(22) Filed: Jan. 27, 2025

(65) Prior Publication Data

US 2025/0270938 A1 Aug. 28, 2025

(30) Foreign Application Priority Data

Feb. 22, 2024 (IN) ............................ 202411012731

(51) Int. Cl.

*F01D 11/00* (2006.01)
*C10M 103/04* (2006.01)

(Continued)

(52) U.S. Cl.

CPC ........... *F01D 11/00* (2013.01); *C10M 103/04* (2013.01); *C10M 103/06* (2013.01);

(Continued)

(58) Field of Classification Search

CPC ....... F01D 11/00; F01D 5/288; C10M 103/04; C10M 103/06; C10M 125/08;

(Continued)

(56) References Cited

U.S. PATENT DOCUMENTS 4,856,963 A 8/1989 Klapproth et al.
4,983,051 A 1/1991 Hibner et al.

(Continued)

FOREIGN PATENT DOCUMENTS

EP 1927670 A1 6/2008
FR 3042555 A1 4/2017
FR 3059041 B1 5/2020

OTHER PUBLICATIONS

Bruce et al., Advanced Seal Technology Role in Meeting Next Generation Turbine Engine Goals, National Aeronautics and Space Administration Lewis Research Center, France, May 11-15, 1998, pp. 1-14.

(Continued)

*Primary Examiner* — Cephia D Toomer
(74) *Attorney, Agent, or Firm* — Dority & Manning, P.A.

(57) ABSTRACT

A coated component is provided that has a relatively low friction coating across a broad temperature range. The coated component includes a substrate having a surface and a wear coating over the surface of the substrate. The wear coating includes dual lubricant constituents diffused within a matrix phase. The wear coating may have an operating temperature range of 35° C. to 850° C. while having a coefficient of friction that is 0.15 to 0.5.

14 Claims, 2 Drawing Sheets

(51) Int. Cl.
*C10M 103/06* (2006.01)
*C10M 125/08* (2006.01)
*C10M 169/04* (2006.01)
*C10N 30/06* (2006.01)
*C10N 40/00* (2006.01)
*C10N 50/08* (2006.01)

(52) U.S. Cl.
CPC ........ *C10M 125/08* (2013.01); *C10M 169/04* (2013.01); *C10M 2201/053* (2013.01); *C10M 2201/061* (2013.01); *C10M 2201/0623* (2013.01); *C10M 2201/0653* (2013.01); *C10N 2030/06* (2013.01); *C10N 2040/135* (2020.05); *C10N 2050/08* (2013.01); *F05D 2240/55* (2013.01); *F05D 2300/611* (2013.01)

(58) Field of Classification Search
CPC .......... C10M 169/04; C10M 2201/053; C10M 2201/061; C10M 2201/0623; C10M 2201/0653; C10N 2030/06; C10N 2040/135; C10N 2050/08; F05D 2240/55; F05D 2300/611; F05D 2230/30; F05D 2300/21; F05D 2300/2102; F05D 2300/6032; C23C 26/00
See application file for complete search history.

(56) References Cited

U.S. PATENT DOCUMENTS 5,100,158 A 3/1992 Gardner
5,143,384 A 9/1992 Lipschitz
5,301,957 A 4/1994 Hwang et al.
5,376,454 A * 12/1994 Sugasawa ............ F16C 33/201 428/421
5,388,843 A 2/1995 Sedy
5,509,664 A 4/1996 Borkiewicz
5,639,210 A 6/1997 Carpenter et al.
5,975,537 A 11/1999 Turnquist et al.
6,145,843 A 11/2000 Hwang
6,202,302 B1 3/2001 Descoteaux
6,210,103 B1 4/2001 Ramsay
6,422,818 B2 7/2002 Mashey
6,505,837 B1 1/2003 Heshmat
6,572,115 B1 6/2003 Sarshar et al.
6,655,696 B1 12/2003 Fang et al.
6,692,006 B2 2/2004 Holder
6,811,154 B2 11/2004 Proctor et al.
6,895,757 B2 5/2005 Mitchell et al.
7,079,957 B2 7/2006 Finnigan et al.
7,163,369 B2 1/2007 Bruce
7,220,098 B2 5/2007 Bruce et al.
7,334,980 B2 2/2008 Trinks et al.
7,367,776 B2 5/2008 Albers et al.
7,435,049 B2 10/2008 Ghasripoor et al.
7,438,526 B2 10/2008 Enderby
7,448,849 B1 11/2008 Webster et al.
7,459,081 B2 12/2008 Koenig et al.
7,614,792 B2 11/2009 Wade et al.
7,726,660 B2 6/2010 Datta
7,901,186 B2 3/2011 Cornett et al.
8,002,285 B2 8/2011 Justak
8,052,380 B2 11/2011 Willett, Jr.
8,056,902 B2 11/2011 Roddis et al.
8,142,141 B2 3/2012 Tesh et al.
8,177,476 B2 5/2012 Andrew et al.
8,196,600 B1 6/2012 Bruce et al.
8,210,799 B1 7/2012 Rawlings
8,434,766 B2 5/2013 Zeng et al.
8,556,578 B1 10/2013 Memmen et al.
8,641,045 B2 2/2014 Justak
8,678,742 B2 3/2014 Klingels
8,679,641 B2 3/2014 Saxton et al.
9,045,994 B2 6/2015 Bidkar et al.
9,103,223 B2 8/2015 Uehara et al.
9,115,810 B2 8/2015 Bidkar et al.
9,145,785 B2 9/2015 Bidkar et al.
9,255,642 B2 2/2016 Bidkar et al.
9,359,908 B2 6/2016 Bidkar et al.
9,394,801 B2 7/2016 Willett, Jr.
9,587,746 B2 3/2017 Bidkar et al.
9,598,971 B2 3/2017 Hasnedl et al.
9,790,809 B2 10/2017 Dube et al.
9,890,650 B2 2/2018 Von Berg et al.
9,963,988 B2 5/2018 Swedowicz et al.
10,161,259 B2 12/2018 Gibson et al.
10,190,431 B2 1/2019 Bidkar et al.
10,352,455 B2 7/2019 Berard et al.
10,385,715 B2 8/2019 Wong et al.
10,415,418 B2 9/2019 McCaffrey et al.
10,443,424 B2 10/2019 McCaffrey
10,533,566 B2 1/2020 Araki et al.
10,557,014 B2 2/2020 Kverel et al.
10,962,118 B2 3/2021 Duffy et al.
10,995,861 B2 5/2021 Hilbert et al.
11,111,805 B2 9/2021 McCaffrey et al.
11,821,320 B2 11/2023 Johnson et al.
12,000,289 B2 6/2024 Guijarro Valencia et al.
12,006,829 B1 6/2024 Yamarthi et al.
12,448,336 B2 10/2025 Setlur et al.
2001/0007632 A1 7/2001 Pesek et al.
2007/0053772 A1 3/2007 Couture et al.
2008/0056895 A1 3/2008 Senoo
2008/0145649 A1 6/2008 Mannem et al.
2008/0265513 A1 10/2008 Justak
2009/0155479 A1 6/2009 Xiao et al.
2012/0009357 A1 1/2012 Ochiai et al.
2012/0114971 A1 5/2012 Andler et al.
2012/0211944 A1 8/2012 Nishimoto et al.
2012/0223483 A1 9/2012 Bidkar et al.
2012/0248704 A1 10/2012 Fennell et al.
2013/0177437 A1 7/2013 Amancherla et al.
2014/0008871 A1 1/2014 Bidkar et al.
2014/0062024 A1 3/2014 Bidkar et al.
2014/0117624 A1 5/2014 Bidkar et al.
2014/0119912 A1 5/2014 Bidkar et al.
2016/0010480 A1 1/2016 Bidkar et al.
2016/0061331 A1 3/2016 Taylor et al.
2016/0097291 A1 4/2016 Hayford et al.
2016/0130963 A1 5/2016 Wilson et al.
2016/0138412 A1 5/2016 Rioux
2016/0348527 A1 12/2016 Vetters et al.
2016/0376907 A1 12/2016 O'Leary et al.
2017/0051621 A1 2/2017 Ackermann et al.
2017/0051834 A1 2/2017 Webster et al.
2017/0211402 A1 7/2017 Peters et al.
2018/0045066 A1 2/2018 Chuong
2018/0058240 A1 3/2018 Chuong et al.
2018/0372151 A1 12/2018 Sridhar et al.
2018/0372229 A1 12/2018 Bidkar et al.
2019/0072186 A1 3/2019 Bidkar et al.
2019/0085712 A1 3/2019 Wesling et al.
2019/0203842 A1 7/2019 Bidkar et al.
2019/0218926 A1 7/2019 DiFrancesco et al.
2019/0276851 A1 9/2019 Lin
2020/0040735 A1 2/2020 Millier et al.
2020/0063588 A1 2/2020 Morliere et al.
2020/0102845 A1 4/2020 DiFrancesco et al.
2020/0157964 A1 5/2020 Rodriguez Erdmenger et al.
2020/0165931 A1 5/2020 McCaffrey
2020/0271006 A1 8/2020 Wilson et al.
2020/0318489 A1 10/2020 Webb
2021/0207487 A1 7/2021 George et al.
2022/0154590 A1 5/2022 Berard

(56) References Cited

U.S. PATENT DOCUMENTS

2022/0235667 A1 7/2022 Mizumi et al.
2023/0250032 A1* 8/2023 Setlur .................. C04B 41/009 501/126

OTHER PUBLICATIONS

Chupp et al., Sealing in Turbomachinery, NASA/TM-2006-214341, National Aeronautics and Space Administration, Cleveland, OH, 2006, 62 Pages.
Delgado et al., A Review of Engine Seal Performance and Requirements for Current and Future Army Engine Platforms, NASA/TM-2008-215161, 43rd Joint Propulsion Conference Co-Sponsored by AIAA, ASME, SAE, and ASEE, Cincinnati, OH, Jul. 8-11, 2007, 22 Pages.
Grondahl et al., Film Riding Leaf Seals for Improved Shaft Sealing, Proceedings of ASME Turbo Expo 2010: Power for Land, Sea and Air, GT2010-23629, Glasgow UK, Jun. 14-18, 2010, 8 Pages.
Munson et al., Development of Film Riding Face Seals for a Gas Turbine Engine, Tribology Transactions, vol. 35, Issue 1, Mar. 25, 2008, pp. 65-70.
Steinetz et al., Advanced Seal Technology Role in Meeting Next Generation Turbine Engine Goals, RTO AVT Symposium on Design Principles and Methods for Aircraft Gas Turbine Engines, 1998, 14 pgs.

* cited by examiner

LOW FRICTION COATINGS FOR BROAD TEMPERATURE RANGES

PRIORITY INFORMATION

The present application claims priority to Indian Provisional Patent Application Serial Number 202411012731 filed on Feb. 22, 2024.

FIELD

The present disclosure relates to low friction coatings that are suitable over a wide range of temperatures applications, such as experienced within a gas turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine can be arranged as an engine core comprising at least a compressor section, a combustor section, and a turbine section in axial flow arrangement and defining at least one rotating element or rotor and at least one stationary component or stator. A seal assembly, specifically a labyrinth seal assembly, can be located between the stator and the rotor and be used to reduce leakage fluids between the rotor and stator. In a bypass turbofan implementation, an annular bypass air flow passage is formed about the core, with a fan section located axially upstream of the compressor section.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DEFINITIONS

Figure 1:
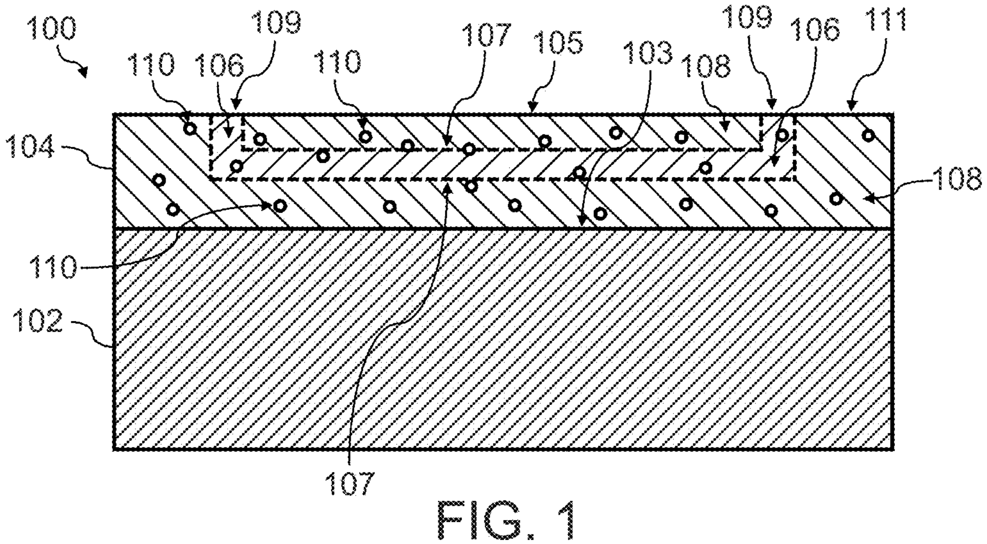
FIG. 1 is a cross-sectional view of a coated component having an exemplary wear coating on a surface of a substrate.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, "titania" refers to a titanium oxide, such as in the form of $TiO_2$.

As used herein, "silica" refers to silicon oxide in the form of $SiO_2$. Conversely, "elemental silicon" refers to silicon without any alloying materials present, outside of incidental impurities. It is sometimes referred to in the art as "silicon metal." Elemental silicon has a melting point of about 1414° C.

As used herein, a "cobalt oxide" refers to any form of a cobalt element bonded to at least one oxygen element, depending on the valence of the cobalt element in the cobalt oxide. For example, cobalt (II) forms cobaltous oxide (CoO); cobalt (III) forms cobaltic oxide ($Co_2O_3$); and cobalt (II,III) forms a cobalt oxide of $Co_3O_4$.

As used herein, the term "transition-metal element" or "M" refers to a chemical element in the d-block of the periodic table (i.e., groups 3 to 12).

As used herein, the term "chalcogen element" refers to the chemical elements in group 16 of the periodic table, including the elements of oxygen (O), sulfur (S), selenium (Se), tellurium (Te), polonium (Po), and livermorium (Lv), or mixtures thereof. Since the heavier chalcogen elements of polonium (Po) and livermorium (Lv) are radioactive elements, the primary chalcogen elements are oxygen (O), sulfur (S), selenium (Se), tellurium (Te), or mixtures thereof.

As used herein, "transition-metal dichalcogenide" or "TMD" refers to a compound composed of three atomic planes and two atomic species: a transition metal and two chalcogen elements. In particular, a transition-metal dichalcogenide may be represented by the formula $MX_2$ where M is a transition-metal element and X a chalcogen element. Particularly suitable transition metals within a transition-metal dichalcogenide include Mo, W, or mixtures thereof. For example, the transition-metal dichalcogenides may include $WO_2$, $MoS_2$, $WS_2$, $MoSe_2$, $WSe_2$, $MoTe_2$, or mixtures thereof.

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

As used herein, the term "coefficient of friction" refers to a measurement of the phenomenon to resist relative movement between two surfaces which may be under load. The "coefficient of friction" is experimentally determined (using an equipment like a tribometer) to assess the tangential force (Fr) which causes movement between surfaces under a normal force ($F_n$), such that Friction=$F_t/F_n$. For this particular system, testing was performed at a load of 240 ksi at speeds of 13 mm/s and 50 mm/s across the temperature range (e.g., room temperature to 800° C.).

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

During engine operation, engine components may be subjected to rubbing action while being exposed to a wide range of temperatures (e.g., 35° C. to 850° C.). Managing friction and wear behavior of most components with a single coating for the entire temperature range is quite challenging, since most currently available commercial coatings do not have such wide temperature capability. Moreover, most currently available commercial coatings have limited lubrication capability (e.g., in the 315° C. to 485° C. range) which is either the upper end or lower end of the lubrication capability of these coatings. Thus, components that operate in the 315° C. to 485° C. range also face challenges for managing their friction and wear behavior.

Over time, the lack of such suitable coatings may lead to poor friction performance, which in turn may lead into higher wear and surface degradation of the component. Furthermore, the approach of using multi-layer coatings that have a top layer of a dry film lubricant (DFL) is not durable since over time the DFL gets worn and the subsequent layers do not provide sufficient friction benefit. Thus, a need exists for improved low friction coatings that are suitable over a wide range of temperatures applications.

Figure 2:
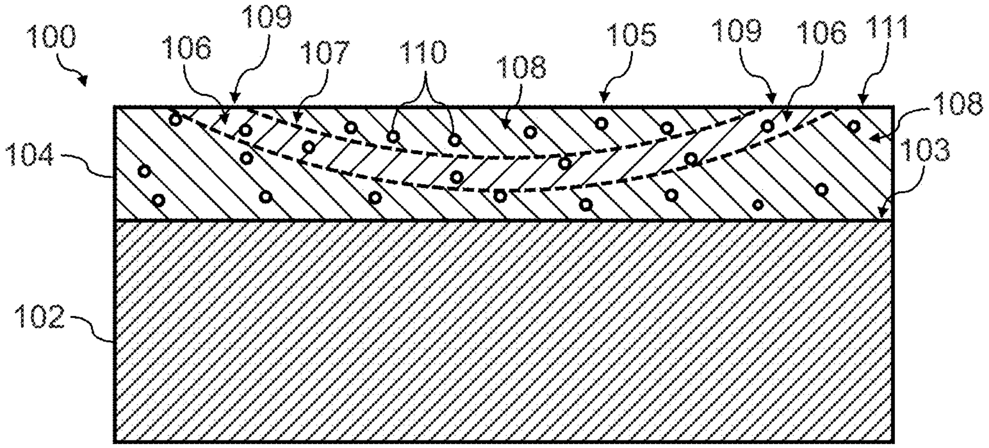
FIG. 2 is a cross-sectional view of a coated component having another exemplary wear coating on a surface of a substrate.
Figure 3:
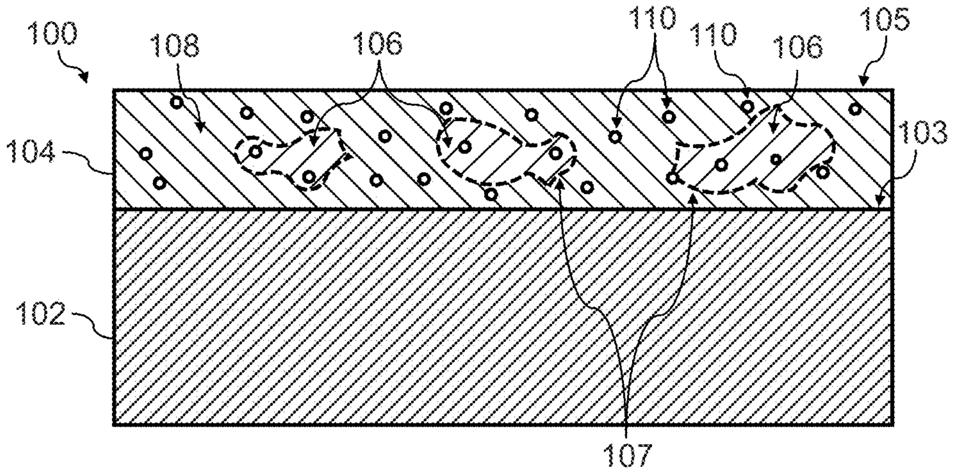
FIG. 3 is a cross-sectional view of a coated component having another exemplary wear coating on a surface of a substrate.

Referring to FIGS. 1-3, exemplary coated components 100 are shown having a substrate 102 with a surface 103. A wear coating 104 is positioned over the surface 103 of the substrate 102. The wear coating 104 generally defines an outer surface 105 that has a coefficient of friction that is less than the coefficient of friction of the surface 103 of the substrate 102. In one particular embodiment, the wear coating 104 can have an operating temperature range of 20° C. to 850° C. while having an average coefficient of friction that is 0.15 to 0.5 across the outer surface 105 of the wear coating 104 throughout the operating temperature range. In one particular embodiment, the wear coating 104 can have an operating temperature range of 35° C. to 800° C. while having an average coefficient of friction that is 0.15 to 0.5 across an outer surface 105 of the wear coating 104 throughout the operating temperature range. For example, under a load of 240 ksi and a movement speed of 13 mm/s at room temperature (e.g., 20° C.-25° C.), the coefficient of friction of the wear coating 104 may be 0.12 to 0.2. At the upper end of the temperature range, under a load of 240 ksi and a movement speed of 50 mm/s at 800° C., the coefficient of friction of the wear coating 104 may be 0.15 to 0.5.

Generally, the wear coating 104 includes dual lubricant constituents 106 diffused within a matrix phase 108. An optional tertiary phase 110 may also be present in the wear coating 104, but in other embodiments, the wear coating 104 may be substantially free from the optional tertiary phase 110. Each of the dual lubricant constituents 106, the matrix phase 108, and the optional tertiary phase 110 are discussed in greater detail below. Although shown as distinct phases in FIGS. 1-3, it is to be understood that this representation is for understanding purposes only. The dual lubricant constituents 106 diffused within a matrix phase 108 are merely shown as a concentrated area of dual lubricant constituents 106 diffused within the wear coating 104 formed from the continuous phase of the matrix phase 108.

The dual lubricant constituents 106 of the wear coating 104 generally include a transition-metal dichalcogenide, which may be represented by the formula $MX_2$ where M is a transition-metal element (e.g., Mo, W, etc.) and X a chalcogen element (e.g., S, Se, Te, or mixtures thereof). Generally, the transition-metal dichalcogenide serves as a dry lubricant of the wear coating 104. Without wishing to be bound by any particular theory, it is believed that the transition-metal dichalcogenide defines a layered structure that reduces friction of the outer surface 105 of the wear coating 104. In one particular embodiment, the dual lubricant constituents 106 of the wear coating 104 generally include a tungsten-containing transition-metal dichalcogenide, such as $WS_2$, and a transition-metal oxide, such as $WO_3$, formed from oxidation of the transition-metal dichalcogenide. In such an embodiment, for example, the tungsten-containing transition-metal dichalcogenide, such as $WS_2$, is oxidized during spraying in an oxygen-containing atmosphere (e.g., air) of the constituents to form the dual lubricant constituents 106 in at least a portion of the wear coating 104.

In one particular embodiment, the dual lubricant constituents 106 comprises the transition-metal dichalcogenide and dual transition-metal oxides. For example, the dual transition-metal oxides may include a transition-metal oxide (e.g., $WO_3$, $MoO_3$, or a mixture thereof) and a composite-cobalt oxide material. The composite-cobalt oxide material may include, for example, a cobalt oxide (e.g., CoO) combined with tantalum pentoxide, titania, silica, or a mixture thereof.

Suitable composite-cobalt oxide materials may include, but are not limited to, silica-composite cobalt oxide (e.g., CoO—$SiO_2$), tantalum pentoxide-composite cobalt oxide (e.g., CoO—$Ta_2O_5$), titania-composite cobalt oxide (e.g., CoO—$TiO_2$), or mixtures thereof. For instance, the composite-cobalt oxide material may be included in the deposition materials utilized to form the wear coating 104.

In particular embodiments, the dual lubricant constituents 106 in the wear coating 104 comprise 50% by weight to 80% by weight of the transition-metal dichalcogenide and 20% by weight to 50% by weight of the transition-metal oxide, relative to the total amount of the dual lubricant constituents. Thus, the transition-metal dichalcogenide may be a primary component of the dual lubricant constituents 106 in that the transition-metal dichalcogenide comprises 50% by weight or more of the dual lubricant constituents 106.

The matrix phase 108 may include a bulk metallic glass, elemental nickel, elemental cobalt, a nickel-chromium alloy (e.g., NiCr), a cobalt-based alloy containing chromium and molybdenum (e.g., Tribaloy® T400 or Tribaloy® T800), or a mixture thereof.

Without wishing to be bound by any particular theory, it is believed that the transition-metal dichalcogenide and the transition-metal oxide may include a transition metal or a mixture of transition metals that are complementary to the components of the matrix phase 108. As such, the transition-metal dichalcogenide and the transition-metal oxide may easily diffuse within the matrix phase 108 while retaining good stability therein.

In one exemplary embodiment, the matrix phase 108 may include an iron-based bulk metallic glass, such as including iron, chromium, tungsten, cobalt, boron, and carbon. For example, the iron-based bulk metallic glass may include 40 at % to 50 at % Fe, 8 at % to 12 at % Cr, 20 at % to 26 at % W, 15 at % to 20 at % Co, 0.5 at % to 3 at % B, and 0.5 at % to 4 at % C. When the matrix phase 108 includes an iron-based bulk metallic glass, one particularly suitable dual lubricant constituents 106 is one where the transition-metal dichalcogenide comprises $WS_2$ and the transition metal oxide comprises $WO_3$. In this example, the W within the transition-metal dichalcogenide and the transition-metal oxide is complementary to the W within the iron-based bulk metallic glass such that the $WS_2$ and $WO_3$ diffuse within the iron-based bulk metallic glass. Without wishing to be bound by any particular theory, it is believed that the $WS_2$ forms a HCP crystal structure that has a lower coefficient of friction than the iron-based bulk metallic glass, and, if the $WS_2$ decomposes in use at high temperatures over time, then $WO_3$ is formed that also serves as a lubricant. Additionally, it is believed that the added W could also enhance the strength and toughness of the iron-based bulk metallic glass.

In an alternative exemplary embodiment, the matrix phase 108 may include a chromium-based bulk metallic glass, such as including chromium, cobalt, tantalum, boron, and carbon. For example, the chromium-based bulk metallic glass may include 40 at % to 45 at % Cr, 40 at % to 45 at % Co, 4 at % to 7 at % Ta, 4 at % to 6 at % B, and 4 at % to 6 at % C. When the matrix phase 108 includes a chromium-based bulk metallic glass, one particularly suitable combination of dual lubricant constituents 106 is one that comprises the transition-metal dichalcogenide, the transition-metal oxide, and a composite-cobalt oxide material including CoO combined with tantalum pentoxide, silica, or a mixture thereof. In this example, the Co within the transition-metal oxide is complementary to the Co within the chromium-based bulk metallic glass such that the cobalt oxide diffuses within the chromium-based bulk metallic glass.

The dual lubricant constituents 106 are present within the wear coating 104 in an amount sufficient to lower the coefficient of friction of the matrix phase 108 (as compared to a matrix phase without any dual lubricant constituents present) while not being present in an amount too high to adversely affect the hardness and strength of the matrix phase 108. In particular embodiments, the dual lubricant constituents 106 are present within the wear coating 104 in a total lubricant concentration of 5% by weight to 25% by weight (e.g., a total lubricant concentration of 10% by weight to 20% by weight).

In FIGS. 1 and 2, an exemplary wear coating 104 is shown where the dual lubricant constituents 106 are diffused within a desired location of the matrix phase 108, with only the lubricant constituents 106 within the matrix phase 108 being shown in different configurations. In the embodiments of FIGS. 1 and 2, both the dual lubricant constituents 106 and the matrix phase 108 may define a continuous phase within the wear coating 104. Thus, the location of the dual lubricant constituents 106 may be strategically positioned within the wear coating 104 to define a first area 109 of the outer surface 105 that has a relatively low coefficient of friction relative to second areas 111 of the outer surface 105 defined by the matrix phase 108. A transition area 107 between a first area 109 with a larger concentration of the dual lubricant constituents 106 and a second area 111 with a larger concentration of the matrix phase 108 is a change in composition therebetween. In one embodiment, the transition area 107 may be a gradient chemical composition transition between the dual lubricant constituents 106 and the matrix phase 108.

Alternatively, FIG. 3 shows an exemplary wear coating 104 where the dual lubricant constituents 106 defines a plurality of discrete phases within the matrix phase 108 defining a continuous phase, with a transition area 107 therebetween.

Regardless of whether the dual lubricant constituents 106 are in continuous or discrete phases the optional tertiary phase 110 may be included. When present, the optional tertiary phase 110 may be distributed as discrete particles throughout the dual lubricant constituents 106, the matrix phase 108, or both. In the illustrated examples, the optional tertiary phase 110 has been illustrated in both the dual lubricant constituents 106 and the matrix phase 108 although that should not be considered limiting. The optional tertiary phase 110 may be distributed unevenly within the wear coating 104 or substantially uniformly throughout the wear coating 104. The optional tertiary phase 110 may be present in a relative amount that is up to 10% by weight of the total weight of the wear coating 104 (e.g., 0.1% by weight to 8% by weight). When present, the tertiary phase 110 may increase the hardness of the wear coating 104. In one embodiment, the tertiary phase 110 may include a hardening constituent, such as tungsten carbide (WC), a carbide containing chromium (e.g., $Cr_3C_2$, $Cr_7C_3$, $Cr_{23}C_6$, or mixtures thereof), alumina, or a mixtures thereof.

Another optional component that may be present in the wear coating 104 is a MAX component according to the formula: $M_{n+1}AX_n$ where M is a transition metal, A is an A-group element (from groups 13-16), X is C, N, or B, and n is the number of X elements present in the MAX component (e.g., 1-5). For example, the MAX component may include a transition metal aluminum carbide, such as titanium aluminum carbide ($Ti_3AlC_2$). Such materials can increase the hardness of the wear coating 104. The optional MAX component may be present in a relative amount that is up to 10% by weight of the total weight of the wear coating 104 (e.g., 0.1% by weight to 8% by weight). The MAX component may be included within the dual lubricant constituents 106, the matrix phase 108, or both.

In the embodiments of FIGS. 1-3, the wear coating 104 is directly on the surface 103 of the substrate 102. However, in other embodiments, intermediate layers may be present on the surface 103 so as to be positioned between the substrate 102 and the wear coating 104.

The wear coatings 104 may be particularly useful on turbine components of a gas turbine engine, particularly at the interface of adjacent turbine components. For example, an exemplary wear coating 104, such as shown in FIGS. 1-3, may be on at least one surface of adjacent components, such as on at least one surface of adjacent components forming a seal between a rotating component and a stationary component.

Figure 4:
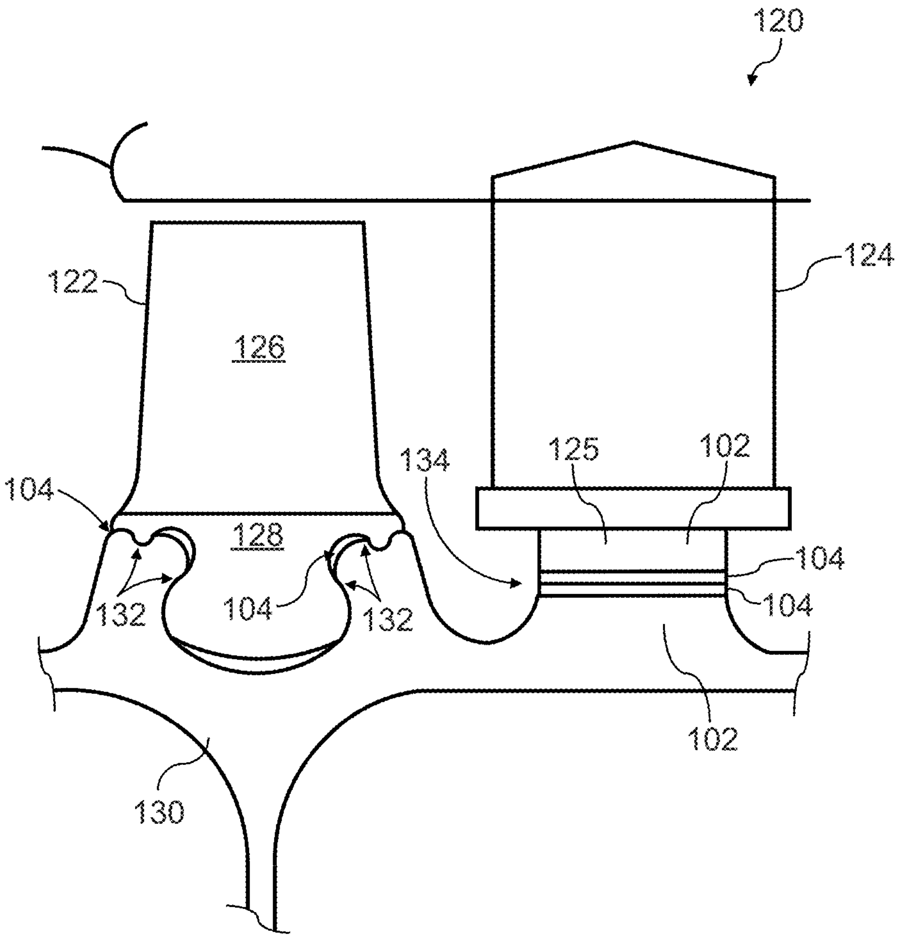
FIG. 4 a cross-sectional view of an exemplary coated components of a gas turbine engine that include a wear coating, such as in FIGS. 1-3, on at least one surface therein.

FIG. 4 shows an exemplary turbine section 120 that includes a rotating fan blade 122 and a stationary vane 124. The rotating fan blade 122 includes an airfoil 126 attached to a dovetail 128. The dovetail 128 is in contact with a rotating disk 130 at the contact areas 132. A wear coating 104, such as described with respect to FIGS. 1-3 above, may be positioned on at least one surface of these contact areas 132. Thus, the wear coating 104 may provide protection along these contact areas 132 to improve the durability of the dovetail 128, the disk 130, or both. In the embodiment shown, the dovetail 128, the disk 130, or both serve as the substrate 102 with a wear coating 104 thereon.

FIG. 4 also shows a seal 134 formed between the rotating disk 130 and a root 125 of the stationary vane 124. In the embodiment shown, the rotating disk 130 serves as the substrate 102 with a wear coating 104 thereon. Also, the root 125 serves as the substrate 102 with a wear coating 104 thereon. Thus, the seal 134 is formed between adjacent substrates 102, both having a respective wear coating 104 thereon.

Of course, the wear coating 104 may be suitable for any substrate 102 within a gas turbine engine. For example, the wear coating 104 may be present on locations of bushings of static vanes.

Methods are generally provided for forming a coated component, such as described above with respect to FIGS. 1-3, along with methods for forming a seal such as shown in FIG. 4. For example, the method may include spraying a mixture onto a surface of a substrate having a surface to form a wear coating thereon. The mixture may include at least one lubricant constituent and a matrix constituent such that a wear coating (as described above) is formed that includes dual lubricant constituents that include a transition-metal dichalcogenide and a transition-metal oxide. That is, when a single lubricant constituent is present in the mixture, the lubricant constituent forms the dual lubricant constituents via oxidation during spraying in an oxygen-containing atmosphere (e.g., air). Spraying may be performed at room temperature or at a heated temperature, if desired. For instance, when the lubricant constituent comprises $WS_2$, then the resulting dual lubricant constituents in the wear component may be $WS_2$ (as the transition-metal dichalcogenide) and $WO_3$ (as the transition-metal oxide) after oxidation of the $WS_2$ during spraying. Similarly, when the lubricant constituent comprises $MoS_2$, then the resulting dual lubricant constituents in the wear component may be $MoS_2$ (as the transition-metal dichalcogenide) and $MoO_3$ (as the transition-metal oxide) after oxidation of the $MoS_2$ during spraying. Of course, the lubricant constituent may further include (in addition to a transition-metal dichalcogenide) a composite-cobalt oxide material that comprises a cobalt oxide combined with tantalum pentoxide, titania, silica, or a mixture thereof, as described above.

Further aspects are provided by the subject matter of the following clauses:

A coated component, comprising: a substrate having a surface; and a wear coating over the surface of the substrate, wherein the wear coating includes dual lubricant constituents diffused within a matrix phase, wherein the wear coating has an operating temperature range of 35° C. to 850° C. while having a coefficient of friction that is 0.15 to 0.5.

A coated component, comprising: a substrate having a surface; and a wear coating over the surface of the substrate, wherein the wear coating includes dual lubricant constituents diffused within a matrix phase, wherein the wear coating comprises a total lubricant concentration of 5% by weight to 25% by weight.

A coated component, comprising: a substrate having a surface; and a wear coating over the surface of the substrate, wherein the wear coating includes dual lubricant constituents diffused within a matrix phase, wherein the dual lubricant constituents comprise a transition-metal dichalcogenide and a transition-metal oxide.

The coated component of any preceding claim, wherein the wear coating comprises a total lubricant concentration of 5% by weight to 25% by weight.

The coated component of any preceding claim, wherein the dual lubricant constituents comprise a transition-metal dichalcogenide and a transition-metal oxide.

The coated component of any preceding claim, wherein the transition-metal dichalcogenide comprises $WS_2$, $MoS_2$, or a mixture thereof.

The coated component of any preceding claim, wherein the transition-metal oxide comprises $WO_3$, $MoO_3$, a composite-cobalt oxide material, or a mixture thereof.

The coated component of any preceding claim, wherein the transition-metal oxide comprises a composite-cobalt oxide material that comprises a cobalt oxide combined with tantalum pentoxide, titania, silica, or a mixture thereof.

The coated component of any preceding claim, wherein the matrix phase comprises a bulk metallic glass, elemental nickel, elemental cobalt, a nickel-chromium alloy, a cobalt-based alloy containing chromium and molybdenum, or a mixture thereof.

The coated component of any preceding claim, wherein the matrix phase comprises a bulk metallic glass.

The coated component of any preceding claim, wherein the bulk metallic glass comprises an iron-based bulk metallic glass that includes iron, chromium, tungsten, cobalt, boron, and carbon.

The coated component of any preceding claim, wherein the transition-metal dichalcogenide comprises $WS_2$, and wherein the transition-metal oxide comprises $WO_3$.

The coated component of any preceding claim, wherein the bulk metallic glass comprises a chromium-based bulk metallic glass that includes chromium, cobalt, tantalum, boron, and carbon.

The coated component of any preceding claim, wherein the transition-metal oxide comprises $WO_3$ and a composite-cobalt oxide material, wherein the composite-cobalt oxide material comprises CoO combined with tantalum pentoxide, silica, or a mixture thereof.

The coated component of any preceding claim, wherein the wear coating further comprises a tertiary phase dispersed within the matrix phase.

The coated component of any preceding claim, wherein the tertiary phase comprises tungsten carbide, a carbide containing chromium, or a combination thereof.

The coated component of any preceding claim, wherein the wear coating further comprises a MAX component according to the formula: $M_{n+1}AX_n$ where M is a transition metal, A is an A-group element, and X is C, N, or B.

The coated component of any preceding clause, wherein the wear coating has an operating temperature range of 35° C. to 850° C. while having a coefficient of friction that is 0.15 to 0.5.

The coated component of any preceding clause, wherein the coated component forms a seal with another component.

A seal formed between a rotating surface and a stationary surface, the seal comprising a wear coating on the rotating surface, the stationary surface, or both, wherein the wear coating has an operating temperature range of 35° C. to 850° C. while having a coefficient of friction that is 0.15 to 0.5.

A seal formed between a rotating surface and a stationary surface, the seal comprising a wear coating on the rotating surface, the stationary surface, or both, wherein the wear coating includes dual lubricant constituents diffused within a matrix phase, wherein the dual lubricant constituents comprises a transition-metal dichalcogenide and a transition-metal oxide.

A method of forming the coated component of any preceding clause.

A method of forming a coated component, the method comprising: spraying a mixture onto a surface of a substrate having a surface to form a wear coating thereon, wherein the mixture comprises a lubricant constituent and a matrix constituent, and wherein the wear coating has an operating temperature range of 35° C. to 850° C. while having a coefficient of friction that is 0.15 to 0.5.

The method of any preceding clause, wherein the wear coating comprises dual lubricant constituents that include a transition-metal dichalcogenide and a transition-metal oxide.

The method of any preceding clause, wherein the lubricant constituent comprises $WS_2$, $MoS_2$, or a mixture thereof, and wherein the transition-metal oxide comprises $WO_3$, $MoO_3$, or a mixture thereof.

The method of any preceding clause, wherein the lubricant constituent further comprises a composite-cobalt oxide material that comprises a cobalt oxide combined with tantalum pentoxide, titania, silica, or a mixture thereof.

The exemplary coated components discussed herein may have an improved low friction surface over a wide range of temperatures. Thus, the wear coating may generally define an outer surface that has a coefficient of friction that is less than the coefficient of friction of the surface of the substrate. For example, the wear coating can have an operating temperature range of 20° C. to 850° C. while having an average coefficient of friction that is 0.15 to 0.5 across the outer surface of the wear coating throughout the operating temperature range. In one particular embodiment, the wear coating can have an operating temperature range of 35° C. to 800° C. while having an average coefficient of friction that is 0.15 to 0.5 across an outer surface of the wear coating throughout the operating temperature range.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A coated component, comprising:

a substrate having a surface; and a wear coating over the surface of the substrate, wherein the wear coating includes dual lubricant constituents diffused within a matrix phase, and wherein the wear coating has an operating temperature range of 35° C. to 850° C. while having a coefficient of friction that is 0.15 to 0.5, wherein the wear coating comprises a total lubricant concentration of 5% by weight to 25% by weight.

2. A coated component, comprising:

a substrate having a surface; and a wear coating over the surface of the substrate, wherein the wear coating includes dual lubricant constituents diffused within a matrix phase, and wherein the wear coating has an operating temperature range of 35° C. to 850° C. while having a coefficient of friction that is 0.15 to 0.5, wherein the dual lubricant constituents comprise a transition-metal dichalcogenide and a transition-metal oxide.

3. The coated component of claim 2, wherein the transition-metal dichalcogenide comprises $WS_2$, $MoS_2$, or a mixture thereof.

4. The coated component of claim 2, wherein the transition-metal oxide comprises $WO_3$, $MoO_3$, a composite-cobalt oxide material, or a mixture thereof.

5. The coated component of claim 2, wherein the transition-metal oxide comprises a composite-cobalt oxide material that comprises a cobalt oxide combined with tantalum pentoxide, titania, silica, or a mixture thereof.

6. The coated component of claim 2, wherein the matrix phase comprises a bulk metallic glass, elemental nickel, elemental cobalt, a nickel-chromium alloy, a cobalt-based alloy containing chromium and molybdenum, or a mixture thereof.

7. The coated component of claim 2, wherein the matrix phase comprises a bulk metallic glass.

8. The coated component of claim 7, wherein the bulk metallic glass comprises an iron-based bulk metallic glass that includes iron, chromium, tungsten, cobalt, boron, and carbon.

9. The coated component of claim 8, wherein the transition-metal dichalcogenide comprises $WS_2$, and wherein the transition-metal oxide comprises $WO_3$.

10. The coated component of claim 7, wherein the bulk metallic glass comprises a chromium-based bulk metallic glass that includes chromium, cobalt, tantalum, boron, and carbon.

11. The coated component of claim 10, wherein the transition-metal oxide comprises $WO_3$ and a composite-cobalt oxide material, wherein the composite-cobalt oxide material comprises CoO combined with tantalum pentoxide, silica, or a mixture thereof.

12. A coated component, comprising:

a substrate having a surface; and a wear coating over the surface of the substrate, wherein the wear coating includes dual lubricant constituents diffused within a matrix phase, and wherein the wear coating has an operating temperature range of 35° C. to 850° C. while having a coefficient of friction that is 0.15 to 0.5, wherein the wear coating further comprises a tertiary phase dispersed within the matrix phase.

13. The coated component of claim 12, wherein the tertiary phase comprises tungsten carbide, a carbide containing chromium, or a combination thereof.

14. The coated component of claim 1, wherein the wear coating further comprises a MAX component according to the formula: $M_{n+1}AX_n$ where M is a transition metal, A is an A-group element, and X is C, N, or B.

* * * * *